US011366799B2

(12) United States Patent
Sivakumar et al.

(10) Patent No.: US 11,366,799 B2
(45) Date of Patent: Jun. 21, 2022

(54) DATA LOCKING METHOD BASED ON ALTERNATING ROW AND COLUMN LOCKS

(71) Applicant: Huawei Technologies Co., Ltd., Shenzhen (CN)

(72) Inventors: Kalyan Sivakumar, Munich (DE); Antoni Wolski, Munich (DE); Mahesh Kumar Behera, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 213 days.

(21) Appl. No.: 16/659,226

(22) Filed: Oct. 21, 2019

(65) Prior Publication Data

US 2020/0050597 A1 Feb. 13, 2020

Related U.S. Application Data

(63) Continuation of application No. PCT/EP2017/059527, filed on Apr. 21, 2017.

(51) Int. Cl.
*G06F 16/00* (2019.01)
*G06F 16/23* (2019.01)
*G06F 16/22* (2019.01)
*G06F 9/54* (2006.01)

(52) U.S. Cl.
CPC .......... *G06F 16/2343* (2019.01); *G06F 9/546* (2013.01); *G06F 16/221* (2019.01)

(58) Field of Classification Search
CPC ..... G06F 16/2343; G06F 16/221; G06F 9/546
See application file for complete search history.

(56) References Cited

U.S. PATENT DOCUMENTS 5,008,819 A * 4/1991 Gorbatenko .......... G06F 16/901
711/116
7,739,385 B1 * 6/2010 Vinjamuri ............. H04L 41/046
709/229

(Continued)

FOREIGN PATENT DOCUMENTS

CN 103793455 A 5/2014
CN 104008200 A 8/2014

(Continued)

OTHER PUBLICATIONS

Arulraj et al., Bridging the Archipelago between Row-Stores and Column-Stores for Hybrid Workloads. (Year: 2016).*

(Continued)

*Primary Examiner* — Syed H Hasan
(74) *Attorney, Agent, or Firm* — Leydig, Voit & Mayer, Ltd.

(57) ABSTRACT

A device for executing an operation on a database is provided. The device comprises a C-queue configured to store a plurality of column-oriented operations, an R-queue configured to store a plurality of row-oriented operations, a scheduler configured to assign the operation to the C-queue or the R-queue based on whether the operation is row-oriented, a timing unit configured to alternate between C-type time slots and R-type time slots, an execution unit configured to execute operations from the C-queue in C-type time slots and/or operations from the R-queue in R-type time slots.

20 Claims, 5 Drawing Sheets

(56) References Cited

U.S. PATENT DOCUMENTS

| | | | |
|---|---|---|---|
| 2004/0001528 A1* | 1/2004 | Kim | H04B 1/71055 375/130 |
| 2006/0123162 A1* | 6/2006 | Beshai | H04L 49/103 710/58 |
| 2007/0118523 A1* | 5/2007 | Bresch | G06F 16/2343 |
| 2012/0166483 A1* | 6/2012 | Choudhary | G06F 16/2471 707/770 |
| 2012/0209901 A1* | 8/2012 | Xu | G06F 9/505 709/201 |
| 2012/0323873 A1* | 12/2012 | Mistry | G06F 16/2336 707/704 |
| 2013/0031452 A1* | 1/2013 | Samavedula | G06F 40/177 715/227 |
| 2015/0186448 A1 | 7/2015 | Delafranier et al. | |
| 2015/0227582 A1 | 8/2015 | Gu et al. | |
| 2016/0371315 A1 | 12/2016 | Kwon et al. | |

FOREIGN PATENT DOCUMENTS

| | | | |
|---|---|---|---|
| CN | 104133661 A | 11/2014 | |
| CN | 104850631 A | 8/2015 | |
| CN | 105393251 A | 3/2016 | |
| CN | 106068497 A | 11/2016 | |
| CN | 106156126 A | 11/2016 | |
| CN | 106406983 A | 2/2017 | |
| EP | 2608072 A1 * | 6/2013 | G06F 40/177 |
| WO | 2015100985 A1 | 7/2015 | |

OTHER PUBLICATIONS

Bernstein et al., "Concurrency Control and Recovery in Database Systems," pp. 1-58, Addison-Wesley Publishing (1987).
Abadi et al., "Column-Stores vs. Row-Stores: How Different Are They Really?" pp. 967-980 (2008).
Stonebraker et al., "C-Store: A Column-oriented DBMS," pp. 1-12, Proceedings of the 31st VLDB Conference, Trondheim, Norway (2005).
Kemper et al., "HyPer: A Hybrid OLTPandOLAP Main Memory Database System Based on Virtual Memory Snapshots," pp. 195-206, ICDE Conference (2011).
Mukherjee et al., "Distributed Architecture of Oracle Database In-memory," Proceedings of the VLDB Endowment, vol. 8, No. 12, pp. 1630-1641 (2015).
Raman et al., "DB2 with BLU Acceleration: So Much More than Just a Column Store," Proceedings of the VLDB Endowment, vol. 6, No. 11, pp. 1080-1091 (2013).
Zhang et al., "Supporting Multi-row Distributed Transactions with Global Snapshot Isolation Using Bare-bones HBase," 2010 11th IEEE/ACM International Conference on Grid Computing, pp. 177-184, Institute of Electrical and Electronics Engineers, New York, New York (Oct. 2010).
Shou et al., "An Implementation of Attributive Predicate Lock in Database System," Journal of Computer Research and Development, vol. 49, No. 10, pp. 2260-2270 (2012). With English Abstract.
CN/201780089716.5, Office Action/Search Report, dated Sep. 3, 2021.
CN/201780089716.5, Office Action/Search Report, dated Mar. 18, 2022.

* cited by examiner

DATA LOCKING METHOD BASED ON ALTERNATING ROW AND COLUMN LOCKS

CROSS-REFERENCE TO RELATED APPLICATIONS

This application is a continuation of International Application No. PCT/EP2017/059527, filed on Apr. 21, 2017, the disclosure of which is hereby incorporated by reference in its entirety.

TECHNICAL FIELD

Embodiment of the present invention relates to a device for executing an operation on a database and a method for executing an operation on a database. Embodiment of the present invention also relates to a computer-readable storage medium storing program code, the program code comprising instructions for carrying out such a method.

BACKGROUND

In databases with column storing, values that are adjacent in a column are stored adjacently. In contrast, in a database with row storing values of a row are stored adjacently. In analytical processing, column stores are preferable over row stores because many of the query operations are column oriented. In a column store we can consider writes to be column oriented (few column values are written), or row oriented (many, if not all, column values are written).

Traditional locking mechanisms in database systems are based on one-dimensional locking involving locks on rows or groups of rows (pages). This is sub-optimal for a column oriented system because a single row lock can block all concurrent analytical queries.

On the other hand, with column locks, we can allow many concurrent column writes and column oriented queries to run in parallel without conflict dependencies.

Typical database management systems use one-dimensional locking:

a. online transaction processing (OLTP) systems use row oriented locking, b. column-oriented mixed-use systems use row or object oriented locking, c. analytical systems avoid locking all together by creating read-only snapshots for analytical processing.

A problem in the prior art is that, whatever type is chosen in the database system implementation, part of the processing suffers from limited concurrency.

SUMMARY OF THE INVENTION

The objective of the present invention is to provide a device for executing an operation on a database and a method for executing an operation on a database, wherein the device and the method overcome one or more of the above-mentioned problems of the prior art.

A first aspect of the invention provides a device for executing an operation on a database, the device comprising:

a C-queue for storing a plurality of column-oriented operations, an R-queue for storing a plurality of row-oriented operations, a scheduler configured to assign the operation to the C-queue or the R-queue based on whether the operation is row-oriented, a timing unit configured to alternate between C-type time slots and R-type time slots, and an execution unit configured to execute operations from the C-queue in C-type time slots and/or operations from the R-queue in R-type time slots.

The device of the first aspect has the advantage that both row- and column-oriented operations can be executed, but the probability that a lock is hit, thus leading to a delay, is significantly reduced. This is because column locks are more likely to interfere with row locks than with other column locks. Thus, it is advantageous to execute column-oriented operations (which require column-locks) and row-oriented operations (which require row-locks) in separate time slots. The device of the first aspect can thus significantly increase the throughput of the database.

The execution unit can for example during a C-type time slot execute a plurality of (column-oriented) operations from the C-queue in parallel and during an R-type time slot execute a plurality of (row-oriented) operations from the R-queue in parallel. Typically, for each operation the execution unit will obtain a lock before executing the operation. For example, when executing an operation from the C-queue, the execution unit will first obtain a corresponding column-lock, then execute the operation from the C-queue, and finally release the column-lock.

When the device employs a multi-core processor, the execution unit may execute concurrent operations (in each time slot) in parallel-processing computing resources, in different cores of a multi-core processor. This is also referred to as physical parallelism. The execution unit may in some embodiments also be configured to use different processing units from a multi-core processor to process operations from the C-queue or the R-queue.

However, even on a single core processor performance gains can be achieved because the execution parallelism can be based on computing threads of the single processor (logical parallelism).

The device of the first aspect can use a two dimensional locking mechanism. The two dimensions are row locks and column locks. Different operations are categorized either as a row oriented operation or column oriented operation. The concurrency is maintained within these groups.

The scheduler can assign the operations to two different queues to be executed at different time slots, based on the required locking mode.

Preferably, no two different locking modes are used at the same time. This can be enforced by a scheduler that exhausts the queues exclusively one or another.

In a first implementation of the device for executing an operation on a database according to the first aspect, the scheduler is configured to assign a set operation to the C-queue. In other words, the scheduler can be configured to consider the set operation as a column-oriented operation and thus assign it to the C-queue.

In one embodiment of the first implementation, all other operations are assigned to the R-queue.

In a second implementation of the device for executing an operation on a database according to the first aspect as such or according to the first implementation of the first aspect, the scheduler is configured to assign a point operation, in particular a row insert, a row delete, a row retrieval and/or a row update, and/or a bulk operation, in particular a bulk insert, a bulk update and/or a bulk mixed operation, to the R-queue.

In other words, the scheduler is configured to consider a point operation as a row-oriented operation and thus assign it to the R-queue.

In a third implementation of the device for executing an operation on a database according to the first aspect as such or according to any of the preceding implementations of the first aspect, the scheduler is configured to assign an operation other than a point operation to the C-queue.

In other words, in this embodiment, except for point operations, all operations are considered as column-oriented operations.

In a fourth implementation of the device for executing an operation on a database according to the first aspect as such or according to any of the preceding implementations of the first aspect, the timing unit is configured to alternate between C-type time slots and R-type time slots in fixed time intervals, preferably in time intervals of a duration between 0.1 and 10 ms, in particular between 0.5 and 2 ms.

Experiments have shown that these times provide a good tradeoff between high throughput an low response time.

In other embodiments, the length of the time intervals is fixed not in terms of certain temporal duration, but rather in terms of the number of executable operations. E.g. a time interval can be configured to be sufficient for executing a predetermined number of operations, e.g. a predetermined number between 100 and 10.000 operations, preferably between 200 and 5.000 operations.

In a fifth implementation of the device for executing an operation on a database according to the first aspect as such or according to any of the preceding implementations of the first aspect, the timing unit is configured to adjust a ratio between a duration of a C-type time slot and a duration of an R-type time slot based on a length of the C-queue and the R-queue.

This has the advantage that the lengths of the queues can be kept in balance and an overall response time can be reduced.

In a preferred embodiment, the timing unit can be configured to adjust the ratio between the duration of the time slots to be proportional to the ratio of the lengths of queues. For example, if the R-queue is twice as long as the C-queue, the timing unit can adjust the R-type time slots to be twice as long as the C-type time slots.

In a sixth implementation of the device for executing an operation on a database according to the first aspect as such or according to any of the preceding implementations of the first aspect, the timing unit is further configured to alternate time slots when a queue is empty.

Thus, it is avoided that the system is idle because there are no operations in the currently active queue.

A second aspect of the invention refers to a method for executing an operation on a database, the method comprising:
  assigning the operation to an R-queue if the operation is row-oriented, otherwise assigning the operation to a C-queue,
  executing an operation from the C-queue during a C-type time-slot,
  executing an operation from the R-queue during an R-type time-slot, and
  switching between C-type time slots and R-type time slots.

In particular, executing an operation from the C-queue can comprise executing a plurality of operations from the C-queue in parallel, and correspondingly for the R-queue.

The methods according to the second aspect of the invention can be performed by the device according to the first aspect of the invention. Further features or implementations of the method according to the second aspect of the invention can perform the functionality of the device according to the first aspect of the invention and its different implementation forms.

In a first implementation of the method of the second aspect, assigning the operation to an R-queue if the operation is row-oriented, otherwise assigning the operation to a C-queue, comprises assigning a set operation to the C-queue.

In a second implementation of the method of the second aspect as such or according to the first implementation of the second aspect, assigning the operation to an R-queue if the operation is row-oriented comprises assigning a point operation, in particular a row insert, a row delete, a row retrieval and/or a row update, and/or a bulk operation, in particular a bulk insert, a bulk update and/or a bulk mixed operation to the R-queue.

In a third implementation of the method of the second aspect as such or according to any of the preceding implementations of the second aspect, assigning the operation to an R-queue if the operation is row-oriented, otherwise assigning the operation to a C-queue, comprises assigning any operation that is not a point operation to the C-queue.

In a fourth implementation of the method of the second aspect as such or according to any of the preceding implementations of the second aspect, switching between C-type time slots and R-type time slots comprises alternating in fixed time intervals, preferably in time intervals of a duration between 0.1 and 10 ms, in particular between 0.5 and 2 ms.

In a fifth implementation of the method of the second aspect as such or according to any of the preceding implementations of the second aspect, switching between C-type time slots and R-type time slots comprises adjusting a ratio between a duration of a C-type time slot and a duration of an R-type time slot based on a length of the C-queue and the R-queue.

In a sixth implementation of the method of the second aspect as such or according to any of the preceding implementations of the second aspect, switching between C-type time slots and R-type time slots comprises switching time slots when a queue is empty.

A third aspect of the invention refers to a computer-readable storage medium storing program code, the program code comprising instructions for carrying out the method of the second aspect or one of the implementations of the second aspect.

BRIEF DESCRIPTION OF THE DRAWINGS

To illustrate the technical features of embodiments of the present invention more clearly, the accompanying drawings provided for describing the embodiments are introduced briefly in the following. The accompanying drawings in the following description are merely some embodiments of the present invention, modifications on these embodiments are possible without departing from the scope of the present invention as defined in the claims.

DETAILED DESCRIPTION OF THE EMBODIMENTS

Figure 1:
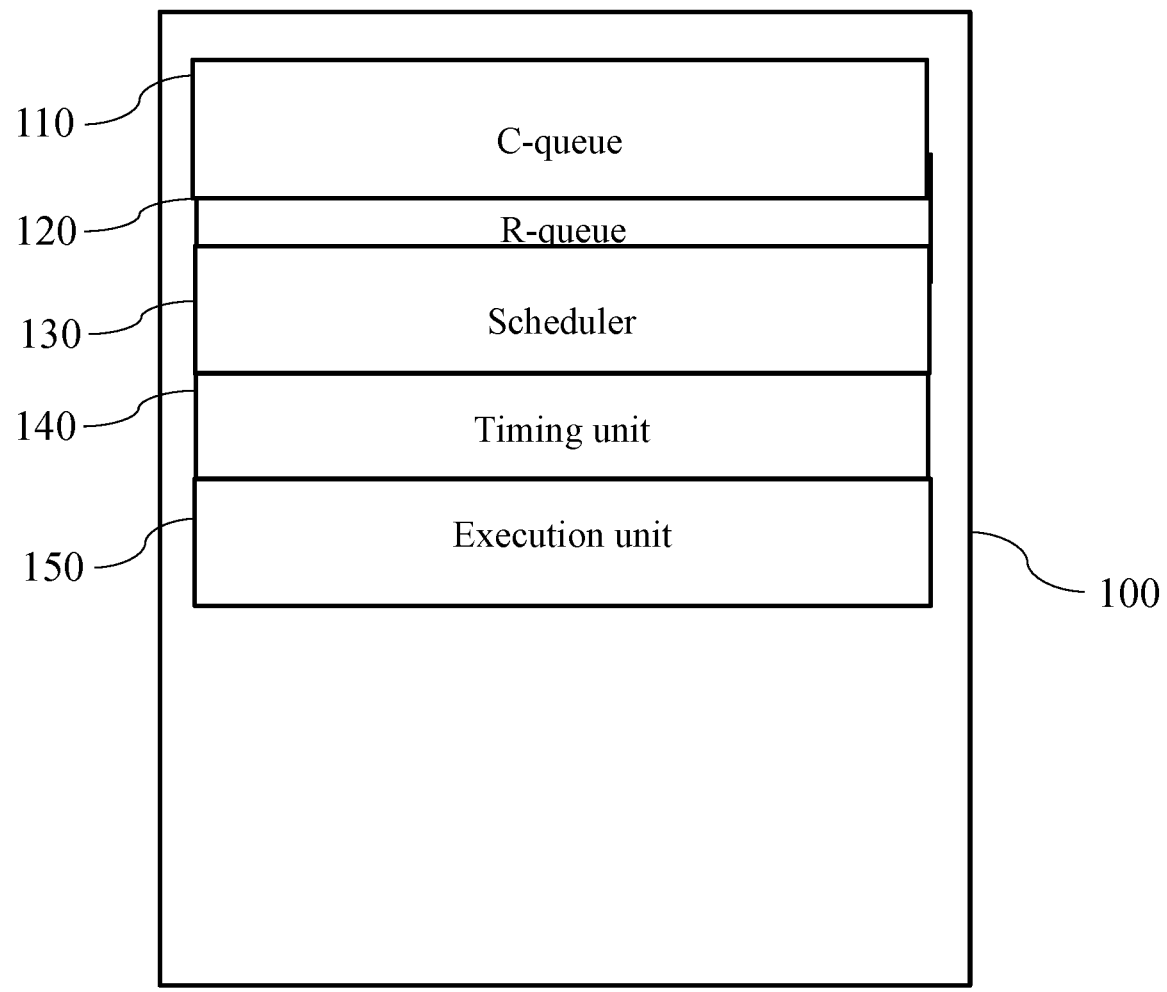
FIG. 1 is a block diagram illustrating a device for executing an operation on a database in accordance with an embodiment of the present invention.

FIG. 1 shows a device 100 for executing an operation on a database.

The device comprises a C-queue 110, an R-queue 120, a scheduler 130, a timing unit 140 and an execution unit 150.

The C-queue 110 is configured to store a plurality of column-oriented operations. The R-queue 120 is configured to store a plurality of row-oriented operations.

The scheduler 130 is configured to assign an incoming operation to the C-queue or the R-queue based on whether the incoming operation is row-oriented.

The timing unit 140 is configured to alternate between C-type time slots and R-type time slots, for example in fixed time intervals.

The execution unit 150 is configured to execute operations from the C-queue in C-type time slots and/or operations from the R-queue in R-type time slots.

Figure 2:
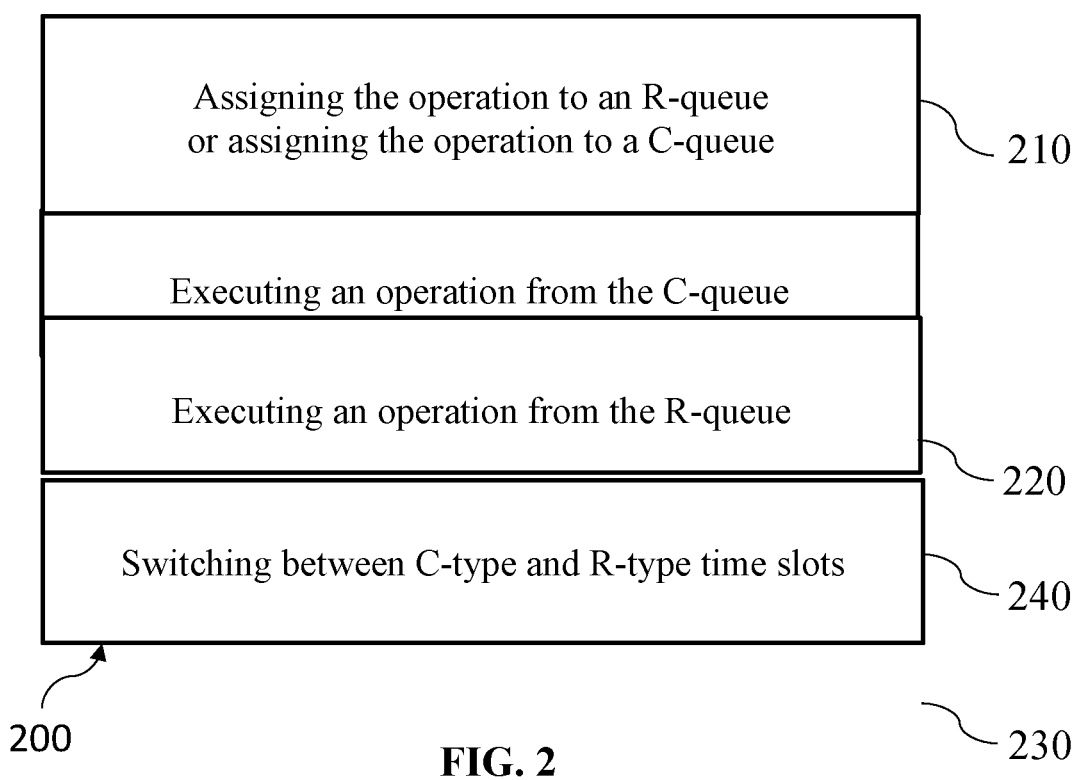
FIG. 2 is a diagram illustrating a method for executing an operation on a database in accordance with a further embodiment of the present invention.

FIG. 2 shows a diagram of an example of a method 200 for executing an operation on a database. The method 200 can be carried out e.g. by the device 100 of FIG. 1.

The method 200 comprises a step of assigning 210 the operation to an R-queue if the operation is row-oriented, otherwise assigning the operation to a C-queue.

The method 200 comprises a further step of executing 220 an operation from the C-queue during a C-type time-slot and/or a further step of executing 230 an operation from the R-queue during an R-type time-slot. Whether operations from the C-queue are executed or operations from the R-queue thus depends on the currently active time slot. The currently active time slot is changed in a further step of switching 240 between C-type time slots and R-type time slots.

It is understood that typically during a C-type time slot a plurality of operations from the C-queue are executed in parallel, and during an R-type time slot a plurality of operations from the R-queue are executed. Thus, collisions between row-oriented and column-oriented operations can be reduced.

Figure 3:
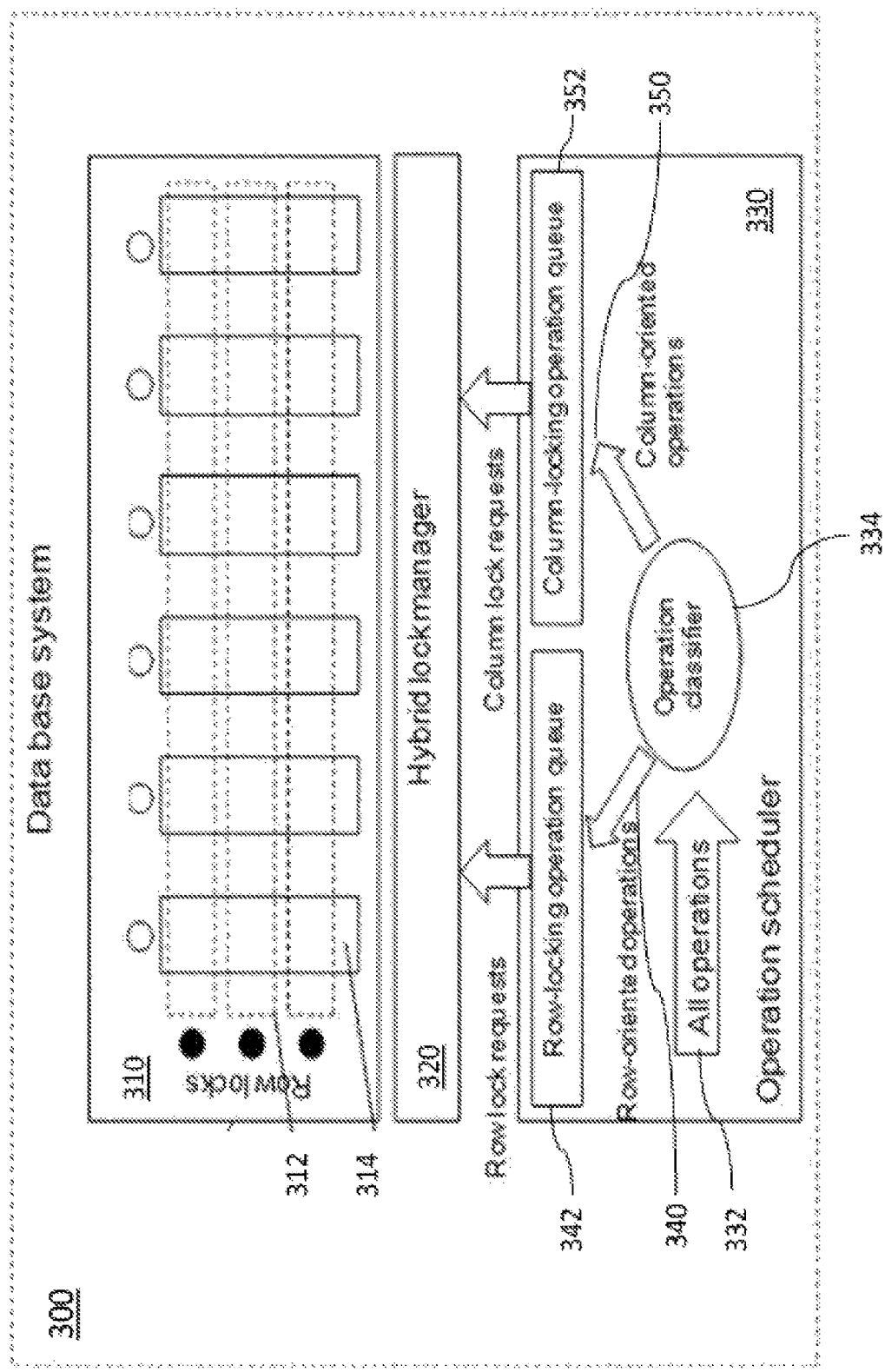
FIG. 3 is a block diagram of a database system comprising a device for executing an operation on a database in accordance with a further embodiment of the present invention.

An illustration of an embodiment of the method implementation is shown in FIG. 3.

FIG. 3 shows a database system 300 comprising a device for executing an operation on a database 310. The device comprises a hybrid lock manager 320 and an operation scheduler 330.

The database system 300 comprises a database 310, the hybrid lock manager 320, which acts as an execution unit, and the operation scheduler 330. The database 310 uses a column store layout and elements from a column are stored in adjacent locations in memory. Despite the physical storage of column data, rows can be accessed through logical rows 312.

The hybrid lock manager 320 maintains the locks on the database 310. These can be column locks and row locks. The hybrid lock manager can comprise an internal data base, e.g. a table, with information about which columns 314 and which rows 312 are currently locked. The hybrid lock manager 320 can be configured to ensure that locks are released when they are no longer needed. The hybrid lock manager 320 receives row lock requests and column lock requests from the operation scheduler 330. The operation scheduler 330 comprises an operation classifier 334, which classifies all incoming operations 332 either as row oriented operations 340 or as column oriented operations 350. The row-oriented operations 340 are assigned to a row-locking operation queue 342, also referred to as R-queue. The column oriented operations 350 are assigned to a column locking operation queue 352, also referred to as C-queue. Row lock requests and row locking operations are passed from the operation scheduler 330 to the hybrid lock manager 320 during an R-type time slot. Column lock requests and column locking operations are passed from the operation scheduler 330 to the hybrid lock manager 320 during a C-type time slot. The transition between R-type time slots and C-type time slots is managed by a timing unit, not shown in FIG. 3.

In FIG. 3, the data storage is depicted as a column store. Column structures are stored physically while the row structures are logically imposed over the stored columns. The system maintains separate locks for row and columns. A hybrid lock manager maintains both kinds of locks.

All operations entering the system are processed by the scheduler where the operation classifier dispatches the operations to one of two queues: one for row-oriented operations (R-queue) and the other one for column-oriented operations (C-queue). The rules of the operation classifier related to various operations are shown in TABLE 1 below.

The queues 342, 352 are exhausted (de-queued) exclusively, i.e. only one queue is exhausted at a time. When a queue of operations is being exhausted, the locks of the corresponding type are requested from the lock manager.

In addition to increased concurrency achieved with the method, the second requirement is to preserve operation (transaction) consistency with two locking modes.

In a single-mode locking system, the locks force the execution into a serializable history. In a two-mode locking system, the two modes have to be alternated in a way that pre-serves serializability.

Each operation that is queued for execution is considered a transaction. This is analogous to the so-called AUTO-COMMIT mode in SQL systems. Transactions can be executed in a different order than the order of submission. In a preferred embodiment, the operation execution preferred by subsequent execution of two methods, as described below.

Figure 4:
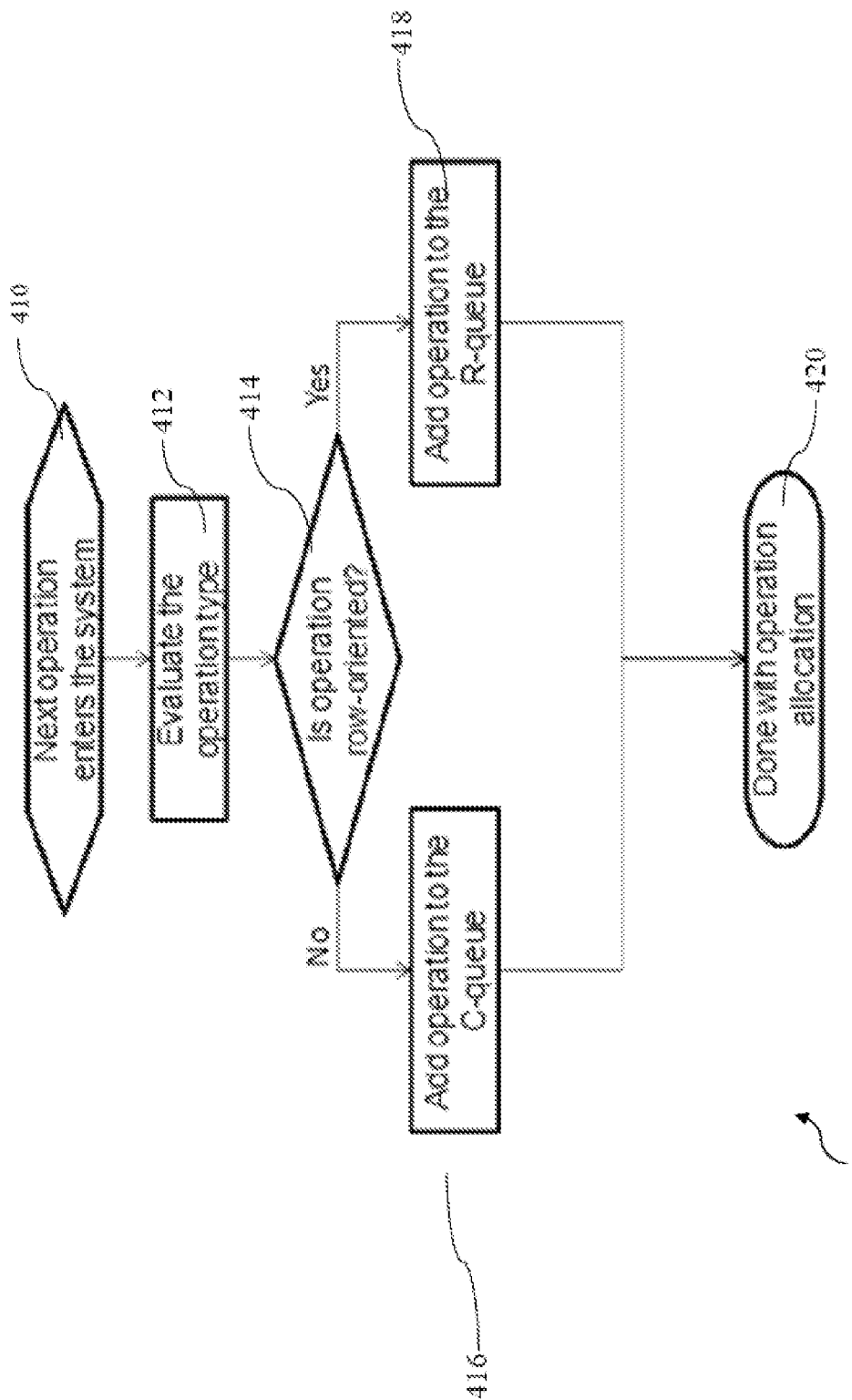
FIG. 4 is a flowchart of a method of the operation scheduler to classify operations entering the system and to allocate them to queues in accordance with a further embodiment of the present invention.

FIG. 4 is a flowchart of a first method 400 of the operation scheduler to classify operations entering the system and to allocate them to queues.

The method 400 comprises a first step 410, wherein a new operation entering the system is detected. In a second step 412 an operation type of the new operation is evaluated. In a third step 414 it is determined whether the operation is row oriented. If not, the method continues in a further step 416 of adding the operation to the C-queue. Otherwise, if the operation is row oriented, in an alternative step 418 the operation is added to the R-queue. The method ends in step 420. The method can be executed for each new operation.

In a preferred embodiment, there is a decision table (TABLE 1) that maps operations available in one DBMS to the preferable locking mode. If the preferred mode is "row locks", the operation is queued in the R-queue. If the preferred mode is "column locks", the operation is queued in the C-queue.

In the preferred embodiment, the queues are of the type of a FIFO (first-in-first-out) queue.

TABLE 1

Locking mode decision table

| Keywords | Description | Operations (examples) | Preferred locking mode |
|---|---|---|---|
| Point operations | Single row operation - primary key based | Point insert Point delete Point select Point update | Row locks |
| Set operations | More than 1 row based operation but not all | update t1 set f1 = XXX where f2 = Y and F3 = Z Delete from t1 where f2 = Y and f3 = Z | Column locks |
| Bulk operations | operations triggered by RTLOAD kind of clients. Affect many to all rows | Bulk insert Bulk update Bulk mixed | Row locks |
| Blind operation | operations to change all the rows of a column unconditionally. | update t1 set f1 = 0; | Column locks |
| Adhoc | Select operation with a column-based condition | | Column locks |

The second step deals with the execution of queue operations.

Figure 5:
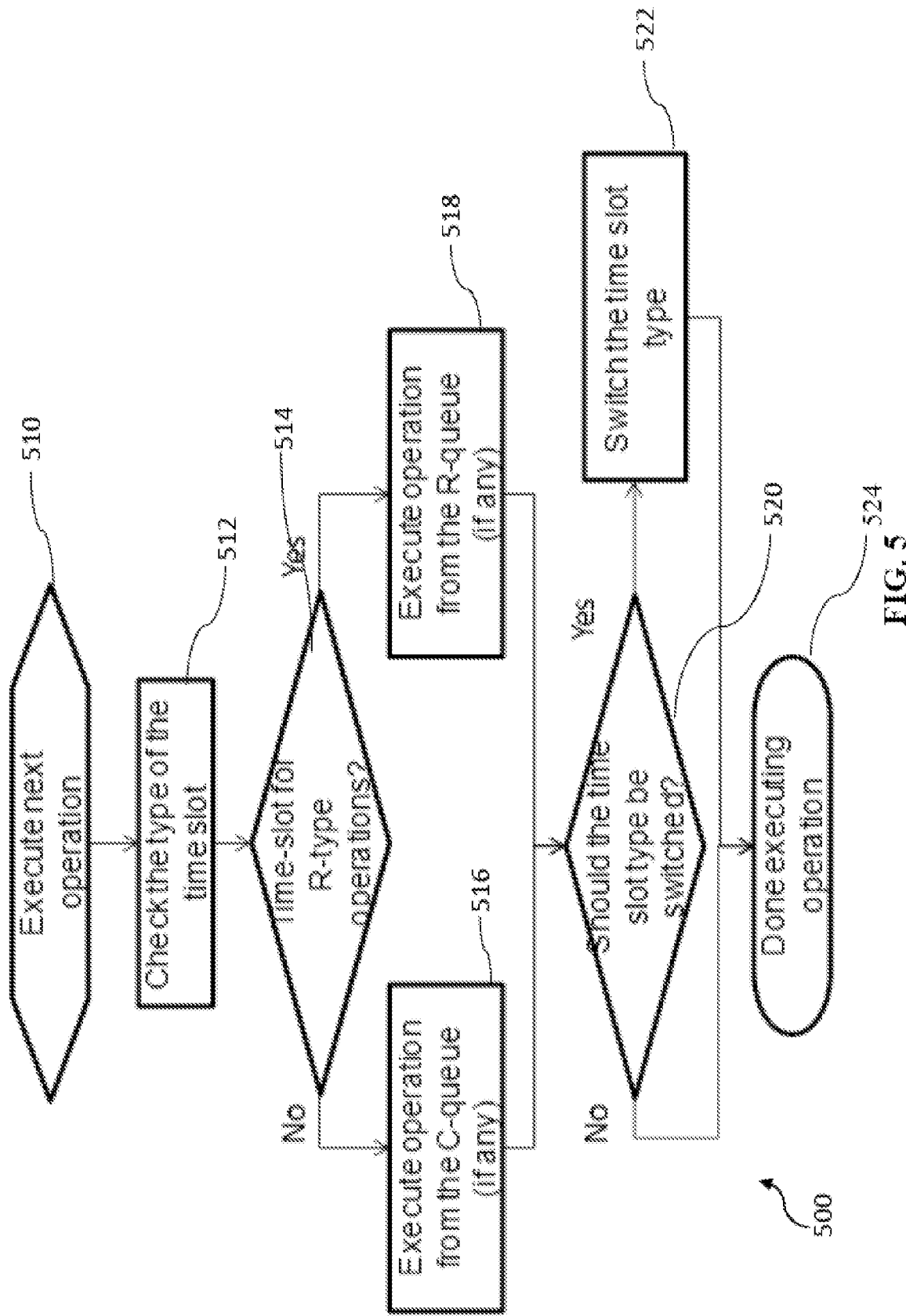
FIG. 5 is a flowchart of a method of the execution unit to execute the operations in the time slots based on the operation type in accordance with a further embodiment of the present invention.

FIG. 5 is a flowchart of a second method 500 of the execution unit to execute the operations in the time slots based on the operation type.

The method 500 begins with a first step 510 when execution of a new operation is started. In a second step 512 the type of the time slot is checked. If in step 514 it is determined that the current time slot is a time slot for R-type operations, the method continues in step 518 with executing operation from the R-queue. Otherwise, if the current time slot is a time slot for C-type operations, the method continues in step 516 with executing an operation from the C-queue. Subsequently, in step 520 it is determined whether the time slot type should be switched. This could be for example because the queue corresponding to the current time slot is empty or because a predetermined time interval has expired. If the time slot type should be switched, the method continues in step 522 with switching the time slot type. Finally, in step 524 execution of the operation by the execution unit is finished.

The scheduler alternates between the two queues, R-queue and C-queue. The alternation can be based on a number of methods.

For example, in the preferred embodiment, the alternation method is based on a fixed time interval. In this case, the interval is derived from the required maximum response time and equals half of that time. For example, if the required response time is at most 2 milliseconds, the switching interval is 1 millisecond, so that a full cycle never exceeds 2 milliseconds. Additionally, the switching occurs when the queue is fully exhausted.

Note that the method 400 of FIG. 4 and the method 500 of FIG. 5 can be run in parallel.

To summarize, embodiments of the device of the first aspect can provide better concurrency in a column store by using two types of locks, in the row and column dimension, to improve concurrency within a group of similar operations:

Using two groups of operations categorized as row oriented or column oriented.
Using a scheduler to classify the operations by type related to the locking dimension.
Using a scheduler which assigns different time slots to different groups of operations, and executes them.
Using a scheduler to maintain dynamically the balance between the two types of time slots, to assure a sustained load in the system.
Using a hybrid lock manager to handle two kinds of locks.
The scheduler and hybrid lock manager become parts of a database system and they replace the corresponding components in a prior art system.

Embodiments of the invention may be configured to execute a column-oriented operation from the C-queue on a first processor of a multi-core processing unit and row-oriented operations from the R-queue on a second processor of a multi-core processing unit.

The foregoing descriptions are only implementation manners of the present invention, the scope of the present invention is not limited to this. Any variations or replacements can be easily made through person skilled in the art. Therefore, the protection scope of the present invention should be subject to the protection scope of the attached claims.

What is claimed is:

1. A device for executing an operation on a database, the device comprising:
   a C-queue for storing a plurality of column-oriented operations on the database, wherein the C-queue is a column-locking operation queue;
   an R-queue for storing a plurality of row-oriented operations on the database, wherein the R-queue is a row-locking operation queue;
   a scheduler for assigning the operation to the C-queue or the R-queue based on whether the operation is a column or row-oriented operation;
   a timer for alternating between C-type time slots and R-type time slots; and
   a hybrid lock manager that cooperates with the scheduler and the timer to execute operations from the C-queue in C-type time slots and operations from the R-queue in R-type time slots, wherein the hybrid lock manager locks only one or more columns during execution of operations for the C-type time slot and locks only one or more rows during execution of operations for the R-type time slots.

2. The device of claim 1, wherein the scheduler is further configured to assign a set operation to the C-queue.

3. The device of claim 1, wherein the scheduler is further configured to assign a point operation or a bulk operation to the R-queue, wherein the point operation comprises at least one of a row insert, a row delete, a row retrieval or a row update, and wherein the bulk operation comprises at least one of a bulk insert, a bulk update or a bulk mixed operation.

4. The device of claim 1, wherein the scheduler is further configured to assign an operation other than a point operation to the C-queue, wherein the point operation comprises at least one of a row insert, a row delete, a row retrieval or a row update.

5. The device of claim 1, wherein the timer is further configured to alternate between C-type time slots and R-type time slots in fixed time intervals.

6. The device of claim 1, wherein the timer is further configured to adjust a ratio between a duration of a C-type time slot and a duration of an R-type time slot based on a length of the C-queue and the R-queue.

7. The device of claim 1, wherein the timer is further configured to alternate time slots when a queue is empty.

8. The device of claim 5, wherein the fixed time intervals are time intervals of a duration between 0.5 and 2 ms.

9. A method for executing an operation on a database, the method, which is applied to a device including a scheduler and a processor, comprising:
- assigning, by the scheduler in cooperation with the processor, the operation to a C-queue or an R-queue based on whether the operation is a column or row-oriented operation,
  - wherein the C-queue is a column-locking operation queue configured to store a plurality of column-oriented operations on the database and the R-queue is a row-locking operation queue configured to store a plurality of row-oriented operations on the database;
- alternately executing, by the processor, an operation from the C-queue during a C-type time-slot, and executing, by the processor, an operation from the R-queue during an R-type time-slot; and
- locking only one or more columns during execution of operations for the C-type time slot and locking only one or more rows during execution of operations for the R-type time slots.

10. The method of claim 9, wherein assigning the operation to the C-queue comprises assigning a set operation to the C-queue.

11. The method of claim 9, wherein assigning the operation to the R-queue comprises assigning a point operation or a bulk operation to the R-queue,
- wherein the point operation comprises at least one of a row insert, a row delete, a row retrieval or a row update, and
- wherein the bulk operation comprises at least one of a bulk insert, a bulk update or a bulk mixed operation.

12. The method of claim 9, wherein assigning the operation to the C-queue comprises assigning any operation that is not a point operation to the C-queue, wherein the point operation comprises at least one of a row insert, a row delete, a row retrieval or a row update.

13. The method of claim 9, wherein alternately executing operations between C-type time slots and R-type time slots comprises alternating in fixed time intervals.

14. The method of claim 9, wherein alternately executing operations between C-type time slots and R-type time slots comprises adjusting a ratio between a duration of a C-type time slot and a duration of an R-type time slot based on a length of the C-queue and the R-queue.

15. The method of claim 9, wherein alternately executing operations between C-type time slots and R-type time slots comprises switching time slots when a queue is empty.

16. The method of claim 13, wherein the fixed time intervals are time intervals of a duration between 0.5 and 2 ms.

17. A non-transitory computer-readable storage medium storing program code, the program code comprising instructions that when executed by a processor, cause the processor to carry out an operation according to the following method:
- assigning the operation to a C-queue or an R-queue based on whether the operation is a column or row-oriented operation,
  - wherein C-queue is a column-locking operation queue configured to store a plurality of column-oriented operations on the database and the R-queue is a row-locking operation queue configured to store a plurality of row-oriented operations on the database;
- alternately executing an operation from the C-queue during a C-type time-slot, and executing an operation from the R-queue during an R-type time-slot; and
- locking only one or more columns during execution of operations for the C-type time slot and locking only one or more rows during execution of operations for the R-type time slots.

18. The non-transitory computer-readable storage medium of claim 17, wherein assigning the operation to the C-queue comprises assigning a set operation to the C-queue.

19. The non-transitory computer-readable storage medium of claim 17, wherein assigning the operation to the R-queue comprises assigning a point operation or a bulk operation to the R-queue, wherein the point operation comprises at least one of a row insert, a row delete, a row retrieval or a row update, the bulk operation comprises at least one of a bulk insert, a bulk update or a bulk mixed operation.

20. The non-transitory computer-readable storage medium of claim 17, wherein assigning the operation to the C-queue comprises assigning any operation that is not a point operation to the C-queue, wherein the point operation comprises at least one of a row insert, a row delete, a row retrieval or a row update.

* * * * *